Nov. 4, 1941.　　W. H. SEARJEANT ET AL　　2,261,812
MOVING PICTURE FILM REEL
Filed Sept. 18, 1939　　3 Sheets-Sheet 2

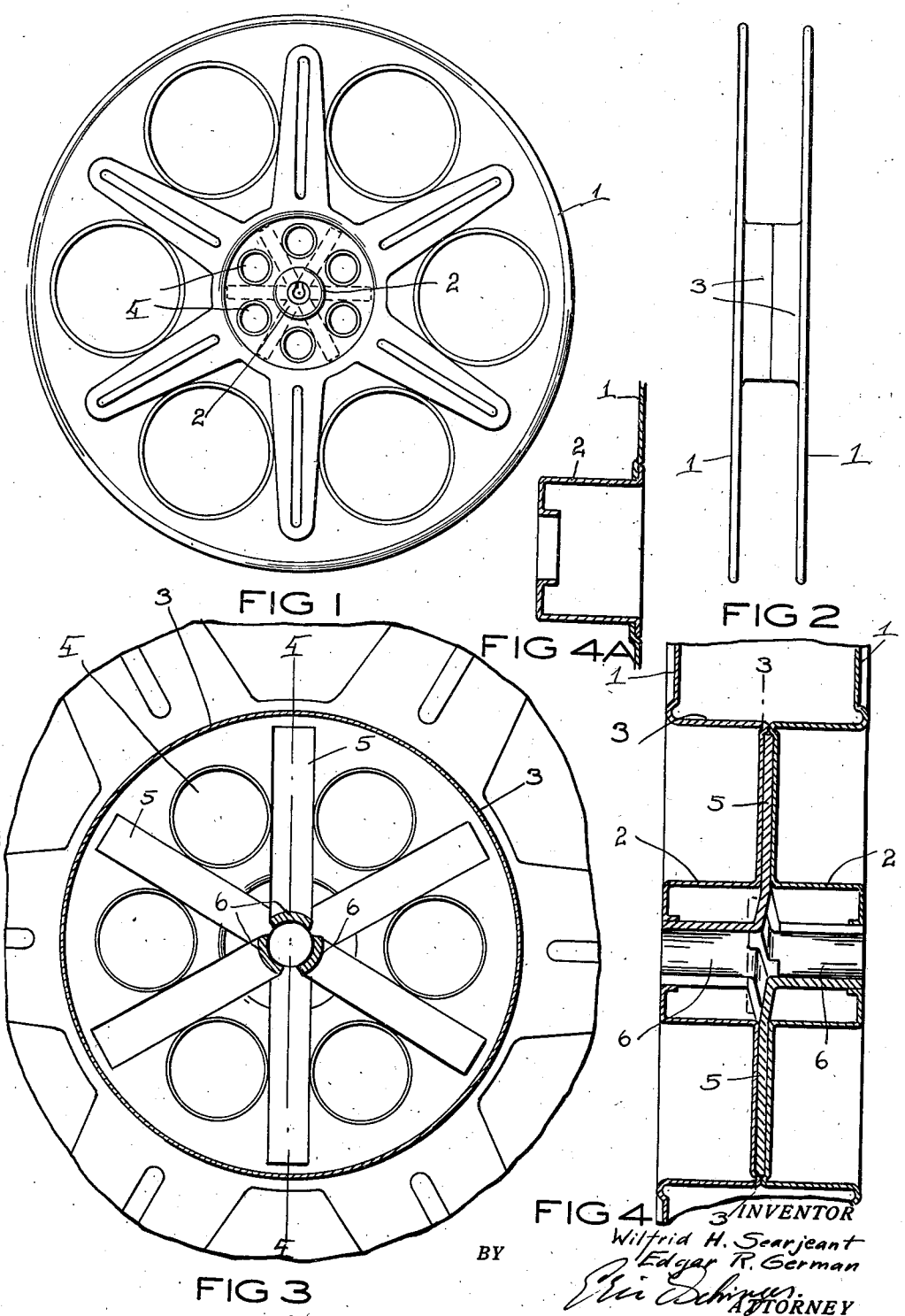

INVENTOR
Wilfrid H. Searjeant
Edgar R. German
BY
ATTORNEY

Nov. 4, 1941.  W. H. SEARJEANT ET AL  2,261,812
MOVING PICTURE FILM REEL
Filed Sept. 18, 1939  3 Sheets-Sheet 3

INVENTOR
Wilfrid H. Searjeant
Edgar R. German
BY
ATTORNEY

Patented Nov. 4, 1941

2,261,812

UNITED STATES PATENT OFFICE 2,261,812

MOVING PICTURE FILM REEL

Wilfrid H. Searjeant and Edgar R. German, Rochester, N. Y., assignors to Taylor-Shantz Inc., Rochester, N. Y., a corporation of New York Application September 18, 1939, Serial No. 295,404

6 Claims. (Cl. 242—70)

This invention relates to moving picture film reels and the like and has for its principal object to provide a novel construction formed entirely of sheet metal.

Another object of this invention is to provide a novel hub structure for a sheet metal reel.

A further object of this invention is to provide a sheet metal reel with a novel driving core for its support and rotation thereof.

Still another object of this invention is to provide a sheet metal reel construction for moving picture film reels which may be manufactured at a minimum cost.

All these and other objects and attendant advantages of the invention will become more readily apparent from the detailed description thereof which follows, reference being had to the accompanying drawings in which—

Figure 1 is a side elevation of the sheet metal reel embodying our invention.

Figure 2 is an end elevation thereof.

Figure 3 is an enlarged sectional view of the central portion of the reel taken thru the middle thereof substantially on the line 3—3 of Figure 4.

Figure 4 is a vertical cross section of the central portion of the reel illustrated in Figure 3, the section being taken on the line 4—4 of Figure 3.

Figures 5 to 9 inclusive illustrate the various steps in the method of making the driving core for the reel from a sheet metal blank.

Figures 10 to 13 inclusive illustrate the various steps in the method of making a modified form of reinforcing plate and driving core for the reel from a sheet metal blank.

Figure 14:
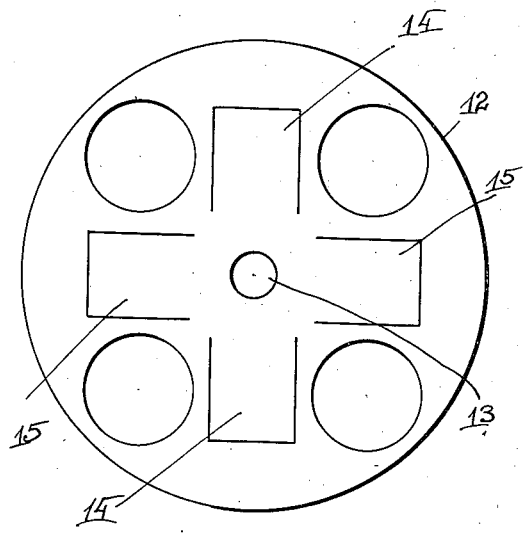
Figure 15:
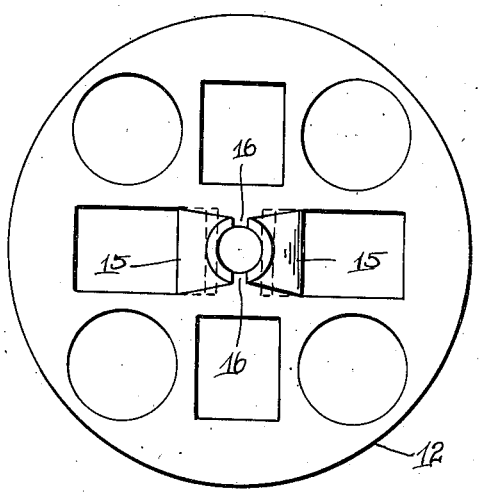
Figure 16:
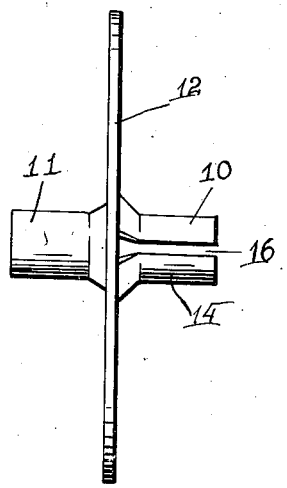

Figures 14 to 16 inclusive illustrate another modified form of reinforcing plate and driving core and the method of making it.

Figure 4A is a detail sectional view illustrating the hub shell of one of the side members of the reel formed separately of the side member and nested into the center thereof.

In winding and unwinding moving picture film the hub structure of the reel which carries the film is called upon to transmit the driving power to the reel and if the construction of the hub and its driving core is weak the useful life of the reel is limited. However, due to the fact that moving picture film reels must be produced at a minimum cost, any increase in the cost of the reel for the purpose of strengthening it reduces the salability thereof. Low cost of manufacture, combined with a strong and durable construction of the reel, is therefore highly important if the reel is to find a ready market for its use.

This has been accomplished in the present construction in which the reel comprises two identical disc shaped sheet metal side members 1, 1 which are annularly depressed centrally thereof to provide the central hub shells 2, 2 and concentric thereto the annular film supporting shoulders 3, 3. The depressed portions of the side members abut each other and each is provided with a plurality of concentrically arranged holes 4, 4. These holes are alternately flanged and enlarged and the flanges of the holes in the depressed portion of one side member engage into the enlarged holes of the other side member to be spun or bent over the edge thereof so as to hold the depressed portions firmly clamped together. With the side members thus clamped together the hub shells 2, 2 are held in alignment.

To give the central portion of the sheet metal reel the proper strength and at the same time provide the hub shells 2, 2 thereof with supporting and driving means, the reinforcing members 5, 5 are embedded between the central portions of the side members and the cores 6, 6 are supported in the hub shells 2, 2 thereof. In the form illustrated in Figures 3 to 9 inclusive each of the reinforcing members 5 comprises a three armed spider which supports a hollow core 6 centrally and offset to one side thereof. In this way the arms of one spider may engage between the arms of the other spider and be held embedded in the depressed abutting portions of the side members to simultaneously reinforce the central portion of the side members and support the core 6 centrally of the hub shells to provide a strong and positive driving connection between the cores and the sheet metal reel. This two core construction and its novel support in the hub increases the rigidity of the hub structure as a whole in that any bending and driving strain of a supporting spindle which engages into the core for the support of the reel will be transmitted from either core to the entire abutting central portions of the side members. Furthermore the two core construction and its two fold support between the abutting central portion of the side members provide a driving connection of maximum strength between each core and the reel while the core supporting members at the same time serve as reinforcing members for the central portion of the reel.

This is in contrast to a single core structure in which the core passes thru an opening in a central supporting and reinforcing plate and requires special means for holding the core against rotation and rocking in the opening of the reinforcing plate and even then provides only part of the driving and supporting strength of the novel two core construction forming the subject matter of the present invention.

Figure 5:
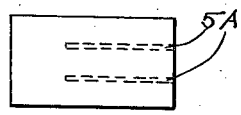
Figure 6:
Figure 7:
Figure 8:
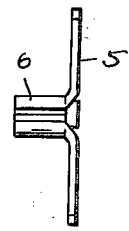
Figure 9:
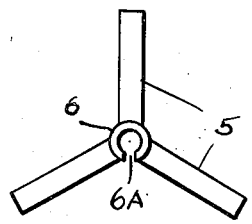
Figure 10:
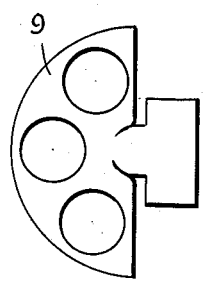
Figure 11:
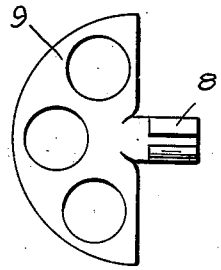
Figure 12:
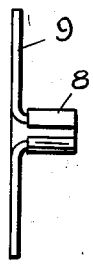

Figures 5 to 9 inclusive illustrate the method of making one of the combined reinforcing members 5 and driving core 6 out of a single sheet metal blank. This blank is substantially rectangular in outline as illustrated in Figure 5 and the first step in the formation of the reinforcing member is to slit the blank as indicated by the dotted line 5A, 5A. The slit blank is then formed into the tube illustrated in Figures 6 and 7 from which the arms of the spider are bent to project radially from the core 6 as illustrated in Figures 8 and 9. In order to provide a key way 6A in the core 6 the abutting beveled edges provided in the formation of the core, as illustrated in Figure 7, are cut away so as to be suitably spaced apart parallel to each other as illustrated in Figure 9.

Figure 13:
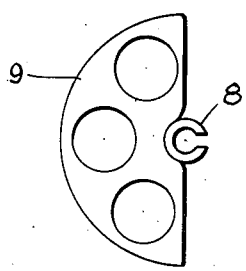

Each combined core and reinforcing member may also be made in the form illustrated in Figure 13 in which the core 8 is formed on a substantially semi-circular disc 9 and is offset to one side thereof at right angles thereto. In the use of this modified form of combined core and reinforcing member, the semi-circular reinforcing discs 9 are embedded side by side in a common plane between the annularly depressed and abutting portions of the side members so that their cores 8 project into the hub shells and are individually connected to and supported between them.

In the modification of the integrally formed supporting plate and driving core illustrated in Figures 14 to 16 inclusive, two separate cores 10 and 11 are formed to project from opposite sides of the single supporting and reinforcing plate 12. These cores are centrally formed on opposite sides of the plate 12 so that they are in line with each other and the central hole 13 in the plate.

The cores are formed by partially severing two pair of radially extending flanges 14, 14 and 15, 15 from the plate 12 and bending each pair of flanges outwardly toward each other on opposite sides of the plate. The inner ends of each pair of flanges are angularly bent toward the center of the plate so as to hold the outer ends of the flanges uniformly spaced parallel to each other as illustrated in dotted lines in Figure 15. The parallel outer ends are then concaved on the inside concentric to the center of the plate 12 to form a practically complete cylindrical core of substantially the same diameter as that of the hole 13 in the plate. The width of the flanges severed and bent from the plate is such that in the formation of the core the longitudinal edges of one flange will be spaced from the opposing edges of the other flange to thus provide two diametrically opposite and longitudinally extending key ways 16, 16 in each core.

While in this construction but one supporting and reinforcing plate is used for the support of both cores instead of a separate reinforcing member for each core, the fact that the cores are separately connected and spacedly held from the plate, a spindle inserted thru the cores for the driving support of the reel will provide the same sturdy driving connection between each of the cores and the center portion of the reel as separate supports would provide for these cores. Furthermore a third central support is provided for the spindle in passing thru the hole 13 in the plate.

In Figure 4A we have illustrated how the hub shell 2 may be formed separately of its side member and nested into the center thereof.

We claim:

1. A sheet metal reel for moving picture films or the like comprising two substantially disc shaped side members, a hub member offset centrally on each side of said side members with the hub member of one side member abutting against the hub member of the other side member, a hollow driving core in each of said hub members centrally thereof, means integral with each of said cores offset from the inner ends thereof so as to locate and arrange said means in a common plane substantially in the middle of the reel and nested in the ends of said abutting hub members to simultaneously hold said cores axially spaced in line with each other centrally of said hub member and provide individual driving connection between said driving cores and said hub members, and means connecting said hub members so as to hold said core supporting means nested between said hub members.

2. A reel for moving picture films and the like as set forth in claim 1 in which said means integral with each of said cores for spacing said cores comprises radially arranged spoke like arms, with the arms of one core located between the arms of the other core and the arms of both cores nested in a common plane between said hub members for central support and alignment of said cores in said hub members.

3. A reel for moving picture films and the like as set forth in claim 1 in which the means integral with said cores comprises a substantially semi-circular disc at one end thereof, with the semi-circular disc of both cores nested in a common plane between said hub members for central support and alignment of said cores in said hub members.

4. A hub for moving picture film reels comprising a pair of hollow driving cores, an integrally formed and radially projecting supporting member provided on each of said cores at one end thereof offset therefrom, and means for holding the supporting members of both of said cores circumferentially spaced in a common plane with said cores axially spaced in line with each other.

5. A hub for moving picture film reels and the like comprising a pair of hollow driving cores, a plurality of integrally formed radially projecting supporting members provided on each of said cores at one end thereof offset therefrom, the supporting members of one of said cores engaging between the supporting members of the other core and means for holding said supporting members of both cores in a common plane with said cores axially spaced in line with each other.

6. A hub for moving picture film reels comprising a sheet metal supporting plate having a central hole therethru, a pair of substantially semi-cylindrical flanges extending axially parallel from each side of said supporting plate, the semi-cylindrical flanges of each pair of flanges being arranged diametrically opposite each other to form a hollow core axially in line with the central hole in the supporting plate.

WILFRID H. SEARJEANT.
EDGAR R. GERMAN.